W. Maxwell,
Fish Net.
Nº 59,429. Patented Nov. 6, 1866.
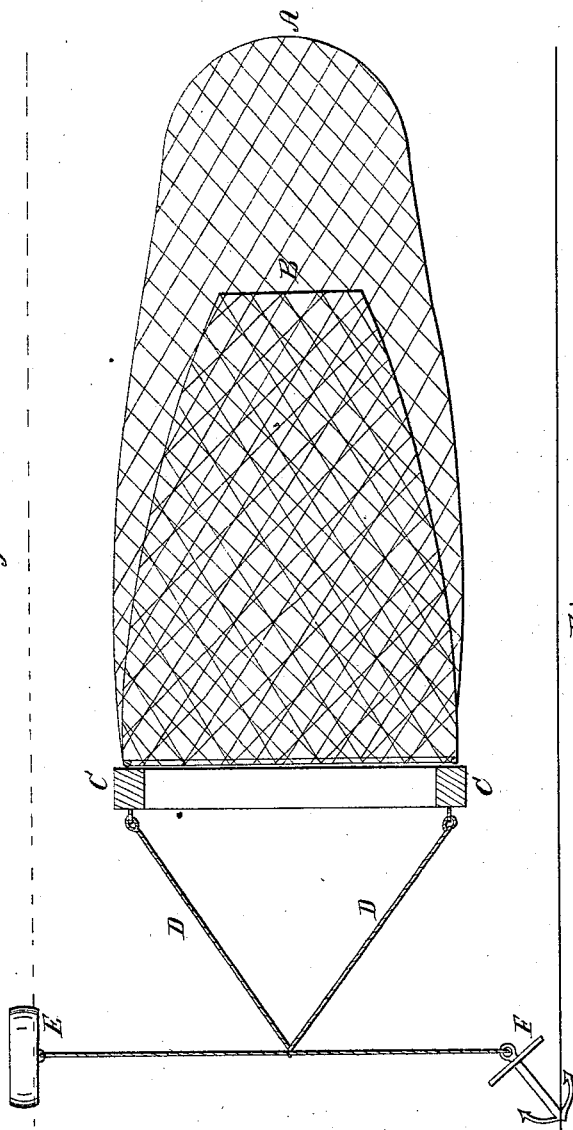
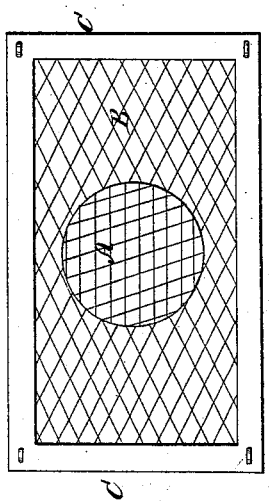
Witnesses:
L. D. Smith
L. Luchs
Inventor,
William Maxwell
By his Atty
J. Franklin Reigart

UNITED STATES PATENT OFFICE.

WILLIAM MAXWELL, OF WASHINGTON, NEW JERSEY.

IMPROVEMENT IN FISHING-NETS.

Specification forming part of Letters Patent No. 59,429, dated November 6, 1866.

*To all whom it may concern:*

Be it known that I, WILLIAM MAXWELL, of the township of Washington, in the county of Burlington and State of New Jersey, have invented an Improved Fishing-Net to be used in any depth of water so as to swing with the tide by anchor and buoy; and I do hereby declare the following to be an exact description thereof, reference being had to the accompanying drawings, and to the letters of reference marked thereon, making a part of this specification.

Figure 1 represents a side view; Fig. 2, a top view.

A represents the outer net; B, the inner net, and C the front frame to which both the nets are permanently fastened. This frame may be round or square. D the rope attached to the frame C, to which another rope is attached having a buoy, E, at one end and an anchor, F, at the other end.

The object and advantage is to fish with this net in any depth of water, so as to swing with the tide by an anchor or buoy. The fishes pass through the first and inner net, B, and are held in the outer net, A, unable to escape. Seines and other shaped nets have been used by being lowered to the bottom of rivers and their places designated by buoys; but with my invention fishes can be caught where the other nets are never used, and cannot swing with the tide.

What I claim as my invention, and desire to secure by Letters Patent, is—

The double net, with a rigid open mouth, when constructed and combined with the buoy and anchor, to regulate its position in any depth of water, as herein described, and for the purposes set forth.

WM. MAXWELL.

Witnesses:
J. FRANKLIN REIGART,
JOHN S. HOLLINGSHEAD.